Jan. 9, 1962   H. J. HUNT   3,016,262
AUTOMOBILE SUN VISOR ACCESSORY
Filed July 13, 1959
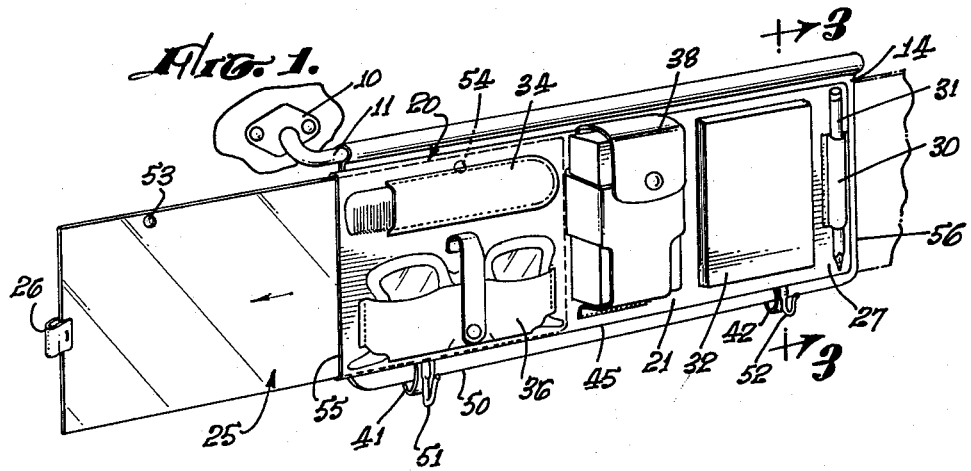
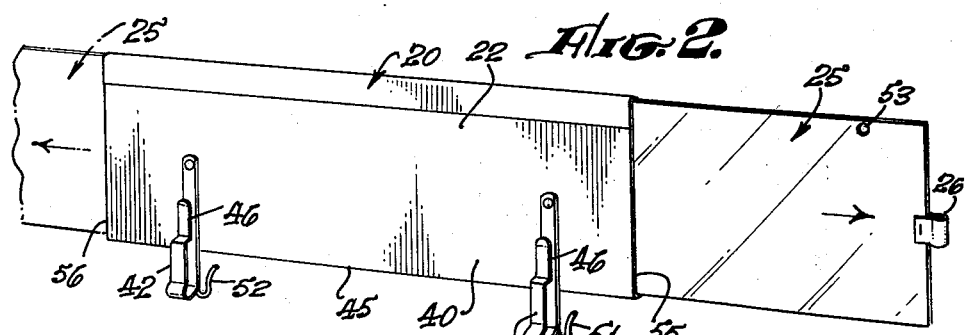
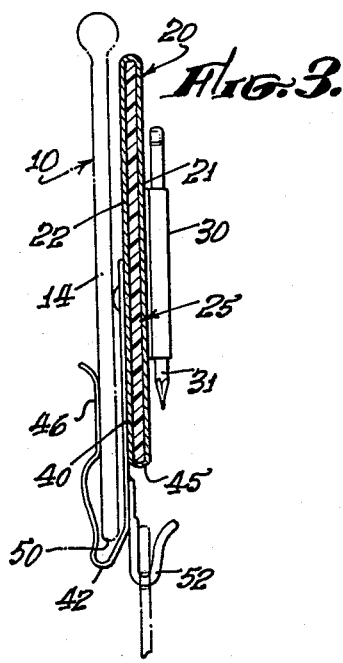
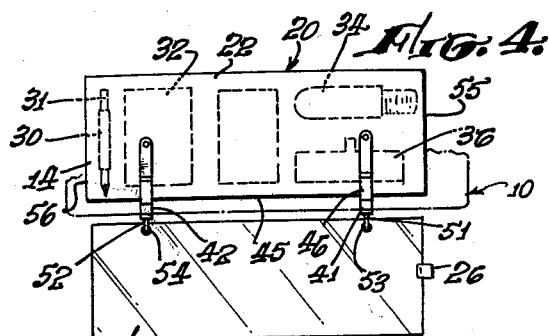
Harry J. Hunt,
INVENTOR
BY Gensley and Horn
ATTORNEYS.

United States Patent Office 3,016,262
Patented Jan. 9, 1962

3,016,262
AUTOMOBILE SUN VISOR ACCESSORY
Harry J. Hunt, 3029½ Independence Ave.,
Kansas City, Mo.
Filed July 13, 1959, Ser. No. 826,874
1 Claim. (Cl. 296—97)

This invention relates to automobile accessories and more particularly to an accessory adapted to be attached to the sun visor of an automobile.

As is well known to drivers of automobiles, the problem of the sun shining into the eyes of the driver is an ever-present and recurring problem. Most automobiles are equipped with sun visors of a type which is an opaque sheet of material that is pivotally mounted for rotation about a horizontally extending rod near the upper edge of the windshield of the automobile. The rod is pivotable about a vertical axis so that it may be swung from the vicinity of the windshield to the vicinity of the driver's side window or a position between. The fact that the opaque sheet is pivotable about the horizontal axis allows the visor to be raised or lowered. However, these visors, of necessity, must be of a fairly uniform size and since they are opaque they cannot be extended too far downward over the windshield since they would then block the vision of the driver. Consequently, the sun often comes to the driver's eyes below the lowest position of the visor such that the visor offers no sun protection to the driver unless he strains upward and thus cuts off all but the bare minimum of the needed line of sight. That is, as is well known, when the sun is low upon the horizon and the driver is driving toward the sun, the sun visor is generally pivoted downward to its lowermost point. However since it is opaque this lowermost point is still substantially above the line of sight of the driver into the sun. In addition, at this lower position and at the other positions of the sun there is at times a substantial reflection or glare of the sun from the hood of the car upward beneath the bottom line of the visor. Furthermore, since the visor is of limited length it is often possible to have the car headed in such a direction that the sun strikes the driver's eyes from a direction to the side of the visor and it is very difficult to move the visor in such a way that the sun is blocked when in this direction.

Accordingly, it is a primary object of the present invention to provide an improved accessory for attachment to a sun visor of the well-known type in automobiles, which accessory provides a transparent but tinted sheet of material in the driver's line of vision beneath the lowermost edge of the opaque sun visor.

It is another object of the present invention to provide such an accessory which furnishes a sheet of material adjustably movable to various positions surrounding the opaque sun visor, which sheet of material is of transparent light reducing material in order to remove the glare from the sun and to allow the driver to look forward toward the sun without undue straining or blinding of the eyes.

It is a further object of the present invention to provide such an accessory which is removably mountable upon a sun visor of the type furnished in automobiles.

Yet another object of the present invention is to provide an accessory of the type described for attachment to a sun visor of an automobile, which accessory also includes various appurtenances for affixing articles to the visor in a handy location for the driver.

It is a still further object of the present invention to provide an accessory which supplements the opaque sun visor of automobiles with an extensible portion of transparent light reducing material which can be extended from the visor to the location at which it is in the driver's line of vision.

The present invention comprises an accessory to be affixed to the opaque sun visor of an automobile and includes a rectangular open-ended envelope with means affixed to the envelope for attaching the envelope to the surface of the sun visor. A sheet of transparent light intensity reducing material is slidably mounted in the open-ended envelope and is adapted to be extended from either end thereof or for removal therefrom. Means are provided in combination with the envelope for attaching the transparent sheet when removed from the envelope to a position at which it extends downward from the accessory beyond the downward, or outward, edge of the visor.

Novel features which are believed to be characteristic of the present invention both as to its organization and method of operation, together with further objects and advantages thereof, will be better understood from the following description considered in connection with the accompanying drawing in which a presently preferred embodiment of the invention is illustrated by way of example. It is to be expressly understood, however, that the drawing is for the purpose of illustration and description only and is not intended as a definition of the limits of the invention.

In the drawing:

FIGURE 1 is a view in perspective of the present invention in its presently preferred embodiment shown mounted upon a conventional sun visor of an automobile, with the tinted transparent sheet partially extended to one side thereof;

FIGURE 2 is a rear view of the accessory;

FIGURE 3 is a view in elevation taken along line 3—3 of FIGURE 1; and

FIGURE 4 is a view showing the transparent sheet utilized to extend beneath the accessory and the sun visor to the position at which it is in the driver's line of vision beneath the visor.

Referring now to the drawing, there is shown a presently preferred embodiment of the present invention. Various modifications and additions will be apparent to one skilled in the art in view of the detailed description hereinafter. In FIGURE 1, the device of the present invention is shown mounted upon a sun visor of the conventional type utilized in automobiles which includes a bracket 10 which pivotally supports a mounting rod 11. The mounting rod extends substantially horizontally and is pivotable in the bracket 10 in a substantially horizontal plane such that it can be moved from a position at the top of the windshield to a position at the top of the window on the driver's side of the automobile. The sun visor is a sheet of opaque material 14 which is mounted upon the rod 11 in a manner allowing it to be pivoted about the rod from a position at which it is near the roof of the automobile to a position at which it extends downward from the rod over a portion of the windshield. The sun visor 14 is thus mounted for pivotal movement substantially about a horizontal axis.

Referring now particularly to FIGURES 1, 2 and 3, the presently preferred embodiment of the present invention includes a main body portion 20 which is formed as an open-ended envelope of sheet material of any suitable type such as semi-rigid plastic or stiffened fibrous material. For example, for the sake of appearance simulated leather material of the type well known to the art can be used which is primarily a vinyl plastic upon a stiffening fibrous material. The sheet material from which the envelope 20 is formed is folded upon itself to provide an open-ended envelope having first and second sides 21 and 22 as shown in FIGURE 3 which are substantially in side-by-side relationship. That is, a convenient way of forming the envelope is to fold a rectangular sheet of the stiffened material upon itself and overlap the edges to form the closed edges of the envelope. The interior surfaces of the two sides 21 and 22 are then substantially in contact to form a friction engagement with the visor element 25 as described hereinafter. Since the visor element may be of relatively soft material and subject to scratching and abrasion it is preferable to utilize material in forming the envelope which is relatively soft and smooth on the interior surface, or to line the interior with a material such as flannel or felt.

The visor element 25 is a rectangular sheet of transparent tinted material of the type well known to the art for reducing the intensity of light passing through, such as acetate resins, or various plastic materials such as transparent but tinted polyesters. The visor is formed as a rectangular sheet having a width substantially equal to the width of the envelope 20 and a length substantially equal to the length of the envelope. Thus, the visor element 25 is slidably mateable with envelope 20 and may be inserted or removed from the envelope at either end thereof. To aid in the insertion and removal of the visor element tabs 26 are placed at each end thereof. Thus, it may be seen that the visor element 25 can be inserted into the envelope 20 at either end and will retain its position when partially inserted due to the frictional engagement between the opposed sides 21 and 22 of the envelope upon the visor element 25.

Various appurtenances are affixed to the outer surface 27 of the envelope 20 to provide means for affixing driver accessories to the device of the present invention. That is, for example, a tubular sleeve 30 adapted to hold a pencil 31 can be sewn to the surface of the envelope, as can a flap which will retain a memo pad 32. There is similarly shown in the presently preferred embodiment a pocket 34 for holding a comb, a flap and fixing means 36 for retaining a pair of sun glasses, and a holder 38 of the proper size to retain a package of cigarettes.

Referring now particularly to FIGURES 2 and 3, means are provided for affixing the envelope 20 to the opaque sheet 14 of the sun visor attached to the automobile. In the embodiment shown spring clamps are used. That is, there are affixed to the back surface 40 of the envelope 20 two similar spring clamps 41 and 42 which are generally U-shaped in configuration with one leg of the U affixed to the back surface 40 and the base of the U extending downwardly beyond the bottom edge 45 of the envelope. The rearward leg 46 of the clamps 41 and 42 is then spring-loaded toward the surface 40 such that the envelope will be retained in position when the U-shaped clamps are forced upward over the lower edge 50 of the opaque sheet 14 of the sun visor. Thus, the device of the present invention is easily inserted upon and removed from the sun visor affixed to the automobile.

Referring now particularly to FIGURES 2, 3 and 4, means are provided for suspending the transparent visor sheet 25 of the device beneath both the device and the lower edge 50 of the opaque sheet 14 to allow the driver to look through the sheet 25 beneath the opaque sheet 14. As discussed hereinbefore, the visor sheet 25 is formed of any one of the many suitable materials known to the art for reducing the glare and intensity of sunlight while permitting vision therethrough. In the embodiment shown, the transparent sheet 25 is suspended beneath both the auto visor and the envelope of the present invention by means of upwardly extending hooks 51 and 52 which are mounted beneath the envelope extending forwardly therefrom. That is, in the direction away from the forward surface 27 of the envelope. The hooks 51 and 52 are spaced apart by a substantial distance and in the embodiment shown are attached to the forward leg of the U-shaped clamps 41 and 42. The base of the U forming the hooks 51 and 52 is positioned at a height proximate the lower edge 50 of the auto visor 14. Openings are provided at 53 and 54 through the transparent visor sheet 25. The openings 53 and 54 are spaced apart by a distance equal to the distance by which the hooks 51 and 52 are spaced apart and the openings 53 and 54 are so sized as to be mateable with the hooks which are insertable therethrough.

Accordingly, it may be seen that the transparent sheet 25 can be removed from either end 55 or 56 of the envelope 20 and attached beneath the envelope and the auto visor 14 by inserting the hooks 50 and 51 through the openings 53 and 54. The transparent sheet then forms a depending sheet of material which is transparent but which reduces sun glare and intensity such that the driver can look through the sheet when peering beneath the auto visor 14 toward the sun which is low on the horizon or toward a glaring area.

Thus, in use in combination with an auto visor 14 the accessory of the present invention is mounted upon the auto visor 14 by inserting the clamps 41 and 42 over the lower edge of the sheet 14 of the auto visor. If the sun is at a location at which it enters the automobile toward the driver's eyes at either side of the auto visor 14, the transparent glare reducing sheet 25 can be pulled partially outward from either end 55 or 56 of the envelope 20 until it is between the driver's eyes and the direction of the sun or glare. If the sun is low upon the horizon or if there is a considerable glare in the driver's eyes, the intensity can be reduced by placing the transparent sheet 25 in the driver's line of vision. In accordance with this invention this is done by removing the transparent sheet 25 from the envelope and affixing it beneath the envelope over the holding means 50 and 51. By pivoting the auto visor 14 about the horizontal axis the transparent sheet 25 can be made to depend at any height or in any position which is desirable.

What is claimed is:

An accessory adapted to be affixed to the surface of an automobile sun visor of the type which includes an opaque sheet pivotally mounted proximate the upper portion of an automobile windshield comprising: an open-ended envelope, said envelope having opposed side surfaces substantially in contact and of generally rectangular configuration, both ends of said envelope being open; means for affixing said envelope to a surface of said opaque sheet of said sun visor with an outer edge of said envelope proximate the outer edge of said opaque sheet, said outer edge being that edge away from said pivotal mounting; a sheet of transparent material having a rectangular configuration substantially equal in size to the configuration of said envelope and slidably mateable therewith in frictional engagement within the opposed sides of said envelope, said transparent sheet being formed of material which reduces the intensity of light passing therethrough, said envelope and said transparent sheet being of a size relative to said opaque sheet which allows the transparent sheet to be partially extended from an open end of said envelope to extend beyond the surface of said opaque sheet; retaining means affixed to said envelope proximate said outer edge thereof, said retaining means including a pair of spaced-apart inwardly extending hooks; and openings provided proximate an edge of said transparent sheet, said openings being mateable with said hooks whereby said transparent sheet can be attached to said hooks to depend beneath said envelope.

References Cited in the file of this patent

UNITED STATES PATENTS

| 2,528,038 | Crise | Oct. 31, 1950 |
| 2,596,873 | Solmes | May 13, 1952 |

FOREIGN PATENTS

| 204,412 | Australia | May 31, 1956 |
| 803,278 | Great Britain | Oct. 22, 1958 |
| 1,184,253 | France | Feb. 2, 1959 |